United States Patent [19]

Duckworth, Jr.

[11] 4,027,701

[45] June 7, 1977

[54] AIRCRAFT LAVATORY DRAIN PLUG

[76] Inventor: Milton Donald Duckworth, Jr., 1316 Orchard Lakes, St. Louis, Mo. 63141

[22] Filed: Dec. 29, 1975

[21] Appl. No.: 645,232

Related U.S. Application Data

[63] Continuation-in-part of Ser. No. 530,679, Dec. 9, 1974, Pat. No. 3,954,123.

[52] U.S. Cl. .............................. 137/800; 251/189; 220/238
[51] Int. Cl.² ......................................... F16L 35/00
[58] Field of Search .......... 220/235, 237, 238, 239; 251/189, 191; 137/800

[56] References Cited

UNITED STATES PATENTS

| | | | |
|---|---|---|---|
| 2,214,732 | 9/1940 | Kraft | 220/235 |
| 2,566,816 | 9/1951 | Work | 220/235 X |
| 3,010,694 | 11/1961 | Lynch | 251/189 |
| 3,543,801 | 12/1970 | Thayer | 220/238 X |

FOREIGN PATENTS OR APPLICATIONS 752,688   7/1956   United Kingdom ............... 220/235

*Primary Examiner*—Harold W. Weakley
*Attorney, Agent, or Firm*—James R. Bell

[57] ABSTRACT

A plug for an aircraft lavatory drain port having a radially expandable portion and a resilient sealing member covering the expandable portion. A locking portion is connected for securing the plug in sealing position. The resilient sealing member includes an axially extended face for enclosing an air space in axial relationship with the radially expandable portion. Also, the resilient sealing member includes a radially facing annular portion mounted on the radially expandable portion. The radially expandable portion urges the radially facing annular portion into sealing engagement with the port as a first sealing capability and the axially extended face can collapse due to pressure acting thereon for urging a portion of that axial face into sealing engagement with the port as a second sealing capability.

1 Claim, 12 Drawing Figures

U.S. Patent  June 7, 1977  Sheet 1 of 4  4,027,701
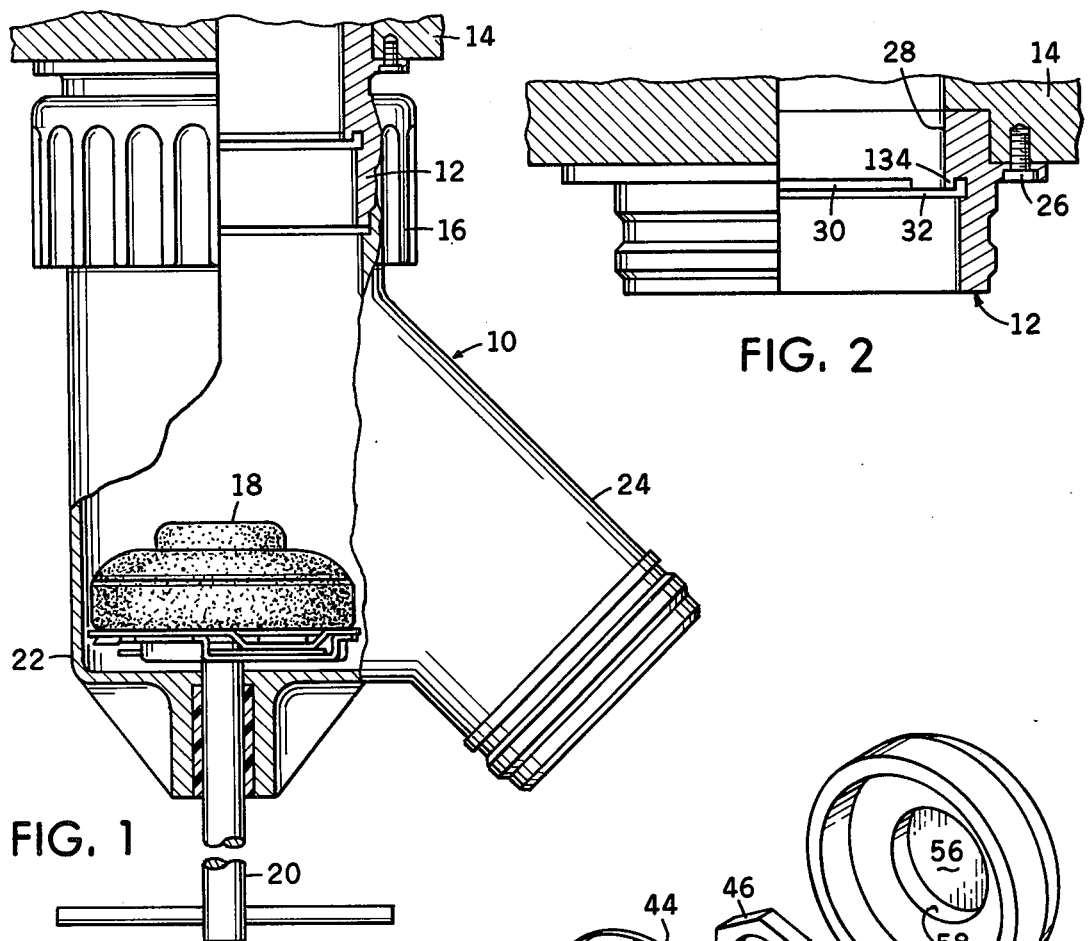
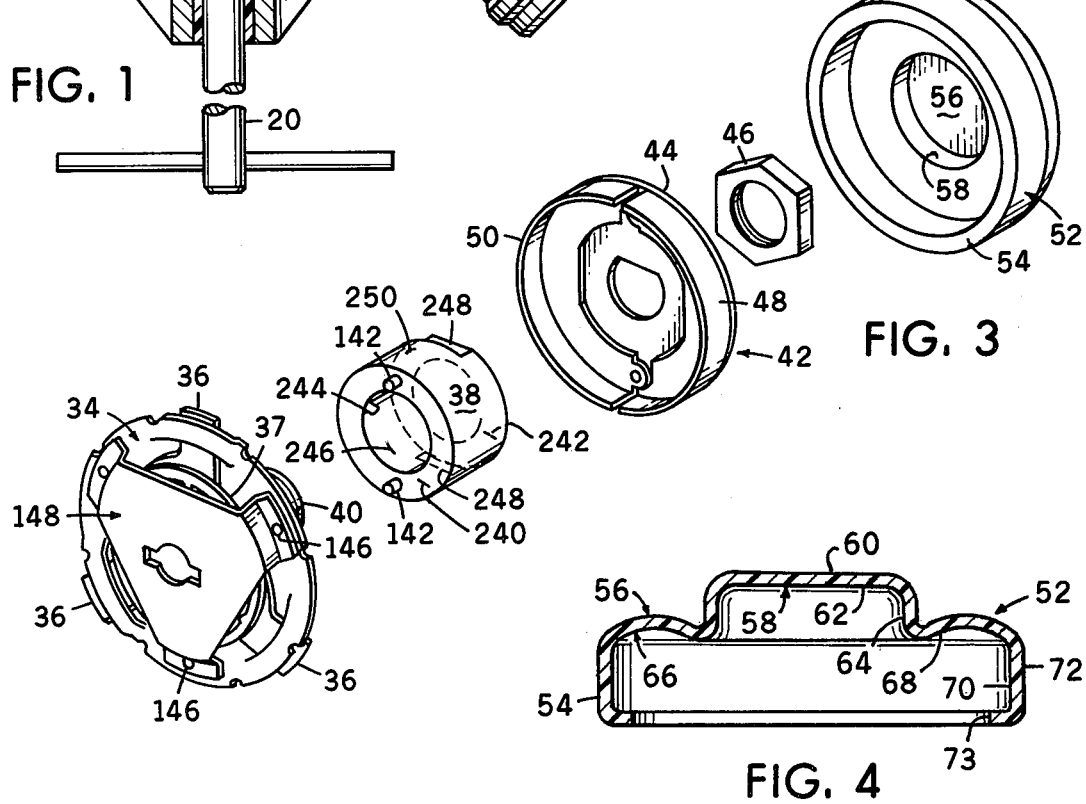

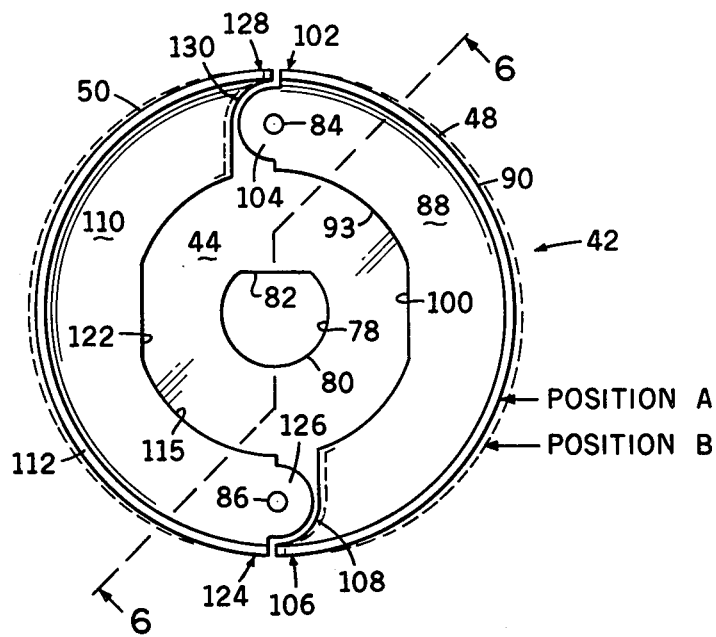
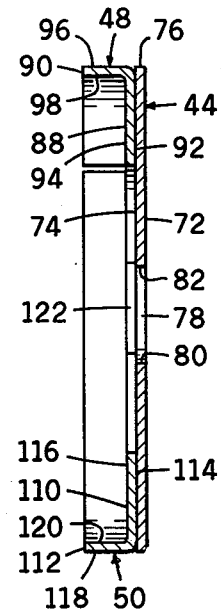
FIG. 5    FIG. 6
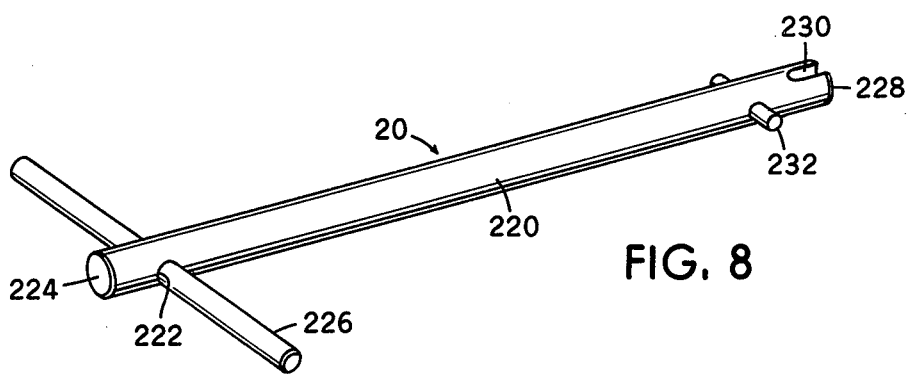
FIG. 8

4,027,701

AIRCRAFT LAVATORY DRAIN PLUG

This is a continuation-in-part of application Ser. No. 530,679, filed Dec. 9, 1974 now U.S. Pat. No. 3,954,123 issued May 4, 1976.

BACKGROUND OF THE INVENTION

1. Field Of The Invention

This invention generally concerns valves of the type with means to increase head and seat contact pressure and more specifically the type having a piston with expansible packing.

2. Description Of The Prior Art

Generally, waste accumulated during aircraft passenger flights is held in a collecting tank until, after landing, airport facilities are used to drain the waste from the tanks. To drain the waste, a port is provided in a convenient location in the aircraft fuselage. A removable plug is inserted into the drain port for maintaining the waste in the tank. Prior to draining the tank, the plug obviously must be removed.

In order to achieve plug removal, a bi-conduit valve and plug assembly was devised. In this prior art arrangement the valve was fitted to the port and a key was used to remove and retract the plug into one of the valve conduits while the waste was drained through the other conduit of the valve. While this arrangement is generally satisfactory the plug has presented some problems.

The plug of the prior art valve is generally annular including a radially expandable resilient sealing member sandwiched between opposed rigid plates. The plates are axially movable relative to each other so that when the plates are drawn toward each other, the resilient member is axially compressed between the plates which results in its radial expansion. With little tolerance between the annular inner periphery of the port prior to expansion, only slight radial expansion of the resilient member is required to urge the outer annular periphery of the resilient member into sealing engagement within the port.

One problem associated with such plugs has involved certain difficulty experienced by ground crew personnel in reinserting the plug into the port after the tank is drained. The opposed plate which is first inserted into the port will sometimes "hang-up" on the port sidewall so as to make plug reentry into the port difficult. Also, should the plug be misaligned in the port, it is still possible to actuate the plug locking mechanism so that in effect the ground crewman thinks the plug is properly seated and locked in the port when, in fact, the plug is misaligned in the port and the locking mechanism may become jammed.

Another disadvantage of the known plug is its prohibitive cost due to its rather complex cam operated mechanism used to axially move the opposed plates toward and away from each other.

It would be advantageous to have a novel plug which is capable of providing a proper seal in the port without the common problems associated with the prior art plug.

SUMMARY OF THE INVENTION

Accordingly, the present invention provides a novel plug for use in the known valve for sealing the aircraft lavatory drain port while avoiding the common problems associated with the prior art plug.

The problem of misalignment is avoided due to the omission of the opposed rigid plates for axially compressing the sealing member. This avoids the tendency to misalign and force the plug into the port. Also, the locking mechanism of the prior art plug has been improved.

The foregoing has been accomplished by providing a plug having a resilient sealing member which is radially expandable due to radial expansion of a mechanical actuating means fitted within the sealing member providing a first sealing capability. The plug is also axially compressible due to an air space provided between the resilient sealing member and the mechanical actuating means for providing a second sealing capability. The plug of this invention has a base plate including radially extendable locking tabs for securing the plug in the port. An annular disc is mounted on the base plate. Radially expandable segmented annular peripheral portions are movably mounted on the annular disc. A resilient sealing member covers the annular disc and the segmented annular portions. A first cam actuates the segmented annular portions and a second cam actuates the locking tabs.

The foregoing and other advantages and novel features will become apparent from the following detailed description of the invention when considered in conjunction with the accompanying drawings.

BRIEF DESCRIPTION OF THE DRAWINGS

In the drawings wherein like parts are marked alike:

FIG. 1 is a side elevation of a conventional aircraft lavatory drain port valve including a partial cutaway view exposing the port plug;

FIG. 2 is a partial cross-sectional side elevation of the port;

FIG. 3 is an isometric assembly view of the novel plug of this invention;

FIG. 4 is a cross-sectional side elevation of the resilient seal member of this invention;

FIG. 5 is a plan view of the radially expandable portion of this invention;

FIG. 6 is a cross-sectional side elevation of the radially expandable portion taken along the line 6—6 of FIG. 5;

FIG. 8 is an isometric view of a key for inserting and removing the plug;

DESCRIPTION OF THE PREFERRED EMBODIMENT

Figure 7:
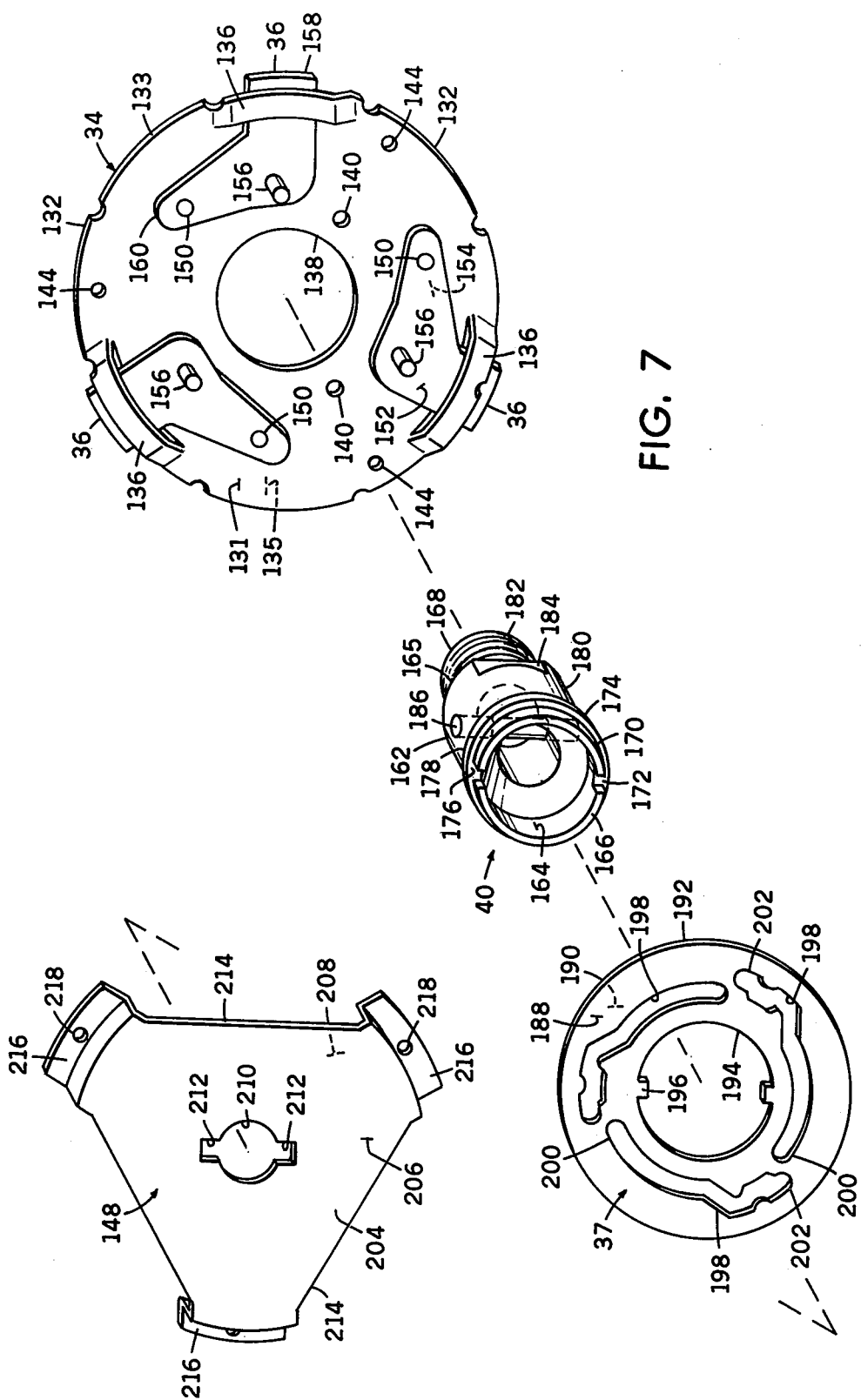
FIG. 7 is an isometric assembly view of the base plate and associated lock portion of this invention.

Referring now to the drawings, FIG. 1 illustrates a prior art bi-conduit valve generally designated 10 connected to port or outlet 12 conventionally secured to aircraft fuselage 14. Collar 16 is provided to secure valve 10 to port 12 as taught by the prior art. Plug 18 is illustrated in a retracted position whereby it is engaged by key 20, disengaged from port 12 and then withdrawn into conduit 22 of valve 10. With port 12 then open as shown, waste may be removed from the aircraft through conduit 24 of valve 10.

In FIG. 2, port 12 is shown as conventionally secured to aircraft fuselage 14 by screws 26, or the like. Port 12 includes stepped inner annular peripheral surface 28 including annular grooves 30, 32, respectively, formed therein.

In FIG. 3, plug 18 is generally shown in greater detail. Plug 18 includes base plate 34 which includes a generally annular disc. Locking tabs 36 are mounted on base plate 34 for radial extension due to rotation of cam plate 37. Cam driver 38 is mounted on plate 34 in a fixed relationship therewith. Attach fastner 40 extends from plate 34 through cam driver 38. Radially expandable portion, generally designated 42 is mounted on base plate 34 via fastner 40. Annular disc 44 of radially expandable portion 42 is secured to attach fastner 40 by means of attach nut 46. Cam driver 38 engages radially expandable portion 42 for radial expansion of segmented expanders 48, 50, respectively, upon rotation of expandable portion 42 relative to driver 38. Generally resilient seal member 52 includes annular sidewall 54 and annular end portion 56 including recess 58 for accommodating nut 46. Seal member 52 is fitted over radially expandable portion 42 so that sidewall 54 embraces segmented annular expanders 48, 50 and end portion 56 covers annular disc 44 so that nut 46 is housed in recess 58.

Resilient Seal Member

Figure 10:
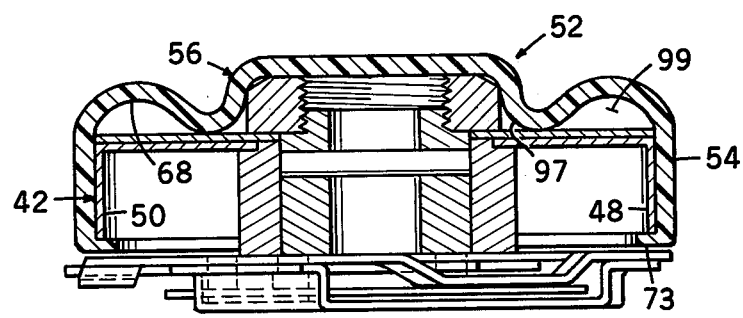
FIG. 10 illustrates the resilient seal member of this invention mounted on the mechanical actuating portion of this invention.

Resilient seal member 52, FIGS. 4 and 10 is preferably of a suitable resilient material such as neoprene rubber, or the like. Seal 52 is generally cup shaped including annular end portion 56 having a dome-like portion 60 providing for recess 58 formed therein. Recess 58 is generally annular for receiving and housing attach nut 46 and includes annular endwall 62 and annular peripheral sidewall 64. Recess 58 opens into generally larger annular recess 66 having curved annular endwall 68, wherein recess 58 is formed, for accommodating disc 44. Recess 66 also includes annular sidewall 54 including inner annular peripheral portion 70 for embracing annular expanders 48, 50 and outer annular peripheral portion 72 for engagement with inner annular peripheral surface 28 of port 12. Sidewall 54 terminates at and is integratedly formed with annular lip portion 73 for maintaining resilient seal 52 on radially expandable portion 42. FIG. 10 specifically illustrates how resilient seal member 52 is mounted on radially expandable portion 42. The result is that the disc-like axially facing curved annular endwall portion 68 of axially facing endwall 56 is axially extended from portion 42 for enclosing airspace 99 therebetween. Curved annular endwall portion 68 is integratedly formed with radially facing annular sidewall 54 and extends radially inwardly therefrom terminating at convolution 97 concentric with sidewall 54.

Radially Expandable Portion

Radially expandable portion 42, FIGS. 5 and 6, generally forms an abbreviated cylinder-like member and is preferably formed of stainless steel and includes annular disc portion 44 and a plurality of segmented radial expanders 48, 50. Annular disc 44 includes opposed substantially flat surfaces 71, 75 and annular outer periphery 76. Aperture 78 is formed in disc 44 and extends therethrough terminating at opposed surfaces 71, 75. Aperture 78 is generally annular including inner annular periphery 80 including a flat peripheral portion 82.

Segmented radial expanders 48, 50 are pivotally mounted on disc 44 by pins or rivets 84, 86, respectively, or the like, for radial movement relative to disc 44. Expander 48 has a segmented generally annular radial portion 88 integratedly formed with a segmented generally annular axial peripheral portion 90. Radial portion 88 includes opposed generally flat surfaces 92, 94 and an inner periphery 93. Axial portion 90 includes outer peripheral portion 96 and opposed inner peripheral portion 98. Inner periphery 93 also includes a generally flat peripheral surface portion 100. First end 102 of expander 48 includes tab 104 formed in a substantially arcuate configuration including an opening formed therein (not shown) for accommodating pin 84 which extends through expander 48 and disc 44 for pivotally mounting the expander on the disc. Second end 106 of expander 48 arcuately opposite first end 102, includes arcuate cutaway portion 108 for accommodating a complimentary fit with a tab provided on expander 50 similar to tab 104 on expander 48.

Expander 50 has a segmented generally annular radial portion 110 integratedly formed with a segmented generally annular axial peripheral portion 112. Radial portion 110 includes opposed generally flat surfaces 114, 116 and an inner periphery 115. Axial portion 112 includes outer peripheral portion 118 and opposed inner peripheral portion 120. Inner periphery 115 also includes a generally flat peripheral surface portion 122 which is substantially at one hundred eighty (180) degrees opposed to flat portion 100 when the expanders are pivotally mounted on disc 44. First end 124 of expander 50 includes tab 126 formed in a substantially arcuate configuration including an opening formed therein (not shown) for accommodating pin 86 which extends through 50 and disc 44 for pivotally mounting the expander on the disc. Second end 128 of expander 50, arcuately opposite first end 124, includes arcuate cutaway portion 130 for accommodating a complimentary fit with tab 104 provided on expander 48 similar to tab 126 on expander 50.

Base Plate And Lock Mechanism

Base plate 34, FIG. 7, comprises a generally annular disc formed of a suitable metal or a synthetic material including radially extending, annularly provided segmented keys 132 on the outer annular periphery 133 for engaging annularly provided segmented stops 134 on the inner annular periphery 28 of port 12, also see FIG. 2. Plate 34 further includes opposed surfaces 131, 135. In this manner, keys 132 guide plate 34 into proper seating alignment adjacent groove 30 within port 12 and limit clockwise and counterclockwise rotation of the plate within the port. Again in FIG. 7, raised guides 136 are provided on surface 131 of plate 34 and may be integratedly formed therewith or may be separately formed and affixed thereto. Guides 136 are provided to guide locking tabs 36 into and out of engagement with groove 32, see again FIG. 2. Referring again to FIG. 7, a centrally located aperture 138 is provided through plate 34 to accommodate attach fastner 40 passing therethrough. Apertures 140 are provided adjacent attach fastner aperture 138 and also extend through plate 34 for receiving and securing nubs 142 of cam driver 38 in a relatively non-rotating relationship with plate 34, see also FIG. 3. Apertures 144 are provided through plate 34 adjacent outer periphery 133 to accommodate pins or rivets 146, or the like for securing cover plate 148 to plate 34. Locking tabs 36 are pivotally mounted on plate 34 by pins 150 or the like. Tabs 36 are generally crescent shaped having generally flat opposed surfaces 152, 154. Keys 156 are provided to extend outward from surface 152 for engaging the keyways provided in cam plate 37. First end 158 of lock tabs 36 is guided through raised guides 136 whereas second end 160 of the lock tabs is pivotally fixed to cam plate 34. Surface 154 of lock tabs 36 is adjacent surface 131 of plate 34.

Attach fastner 40 is formed of a suitable metal or a synthetic material and is generally cylindrical including stepped outer peripheral surface 162 and annular bore 164 extending substantially therethrough from first end 166 and terminating adjacent second end 168 at endwall 165. Outer peripheral surface 162 includes extension 170 adjacent first end 166 having keyways 172 formed therein. Flanged portion 174 of surface 162 includes opposed surfaces 176, 178. Main portion 180 extends toward second end 168 and terminates adjacent reduced diameter threaded extension 182. Portion 180 includes cutaway flat portion 184 formed therein engageable with flat 82 of aperture 78, see also FIG. 5. Roll pin 186, shown in phantom outline, extends through main portion 180 including bore 164.

Cam plate 37 is formed of a suitable metal or a synthetic material and is a generally annular plate having substantially flat opposed sides 188, 190 and an outer annular periphery 192. Centrally located aperture 194 extends through plate 37 between sides 188, 190 and includes keys 196 formed thereon for engaging keyways 172 of attach fastner 40. Keyways 198 are formed in plate 37 as irregularly shaped elongated apertures extending through the plate between opposed surfaces 188, 190 and spiral radially outwardly from first end 200 adjacent aperture 194 toward second end 202 adjacent outer periphery 192 alignable for engaging keys 156 on locking tabs 36.

Cover plate 148 is formed of a suitable metal or a synthetic material and is comprised of a generally triangular shaped member including a generally flat main body portion 204 having opposed sides 206, 208 and a centrally located aperture 210 passing through the plate between sides 206, 208. Central aperture 210 is alignable with bore 164 of attach fastner 40 and further includes radially opposed slots 212. Each of the peripheral sides 214 of plate 148 converge to form legs 216 integratedly formed therewith and axially displaced from plate 148 and each including a securing aperture 218 alignable with apertures 144 of base plate 34.

Key 20, FIGS. 2 and 8 is formed of a suitable metal or a synthetic material and includes a generally elongated cylindrical main portion 220 which is insertable in bore 164 of attach fastner 40 and also having a bore 222 at first end 224 passing transversely therethrough for accommodating handle portion 226. Second end 228 includes a slotted transverse portion 230 for engagement with roll pin 186 of attach fastner 40 and also includes roll pin 232 having a centroidal axis passing transversely through main portion 220 displaced axially inwardly along main portion 220 from slot 230 toward first end 224 and having a centroidal axis displaced substantially at 90° angular rotation from the axis of slot 230. Pin 232 extends radially beyond the diameter of main portion 220 on opposite sides thereof. Main portion 220 is insertable through aperture 210 of plate 148 and pin 232 is insertable through slots 212 of aperture 210.

Cam 38, FIG. 3, is formed of a suitable metal or a synthetic material and is a generally cylindrical member having opposed ends 240, 242 and a generally cylindrical bore 244 extending therethrough between ends 240, 242. Bore 244 includes inner annular peripheral portion 246 provided to accommodate outer annular periphery 162 of attach fastner 40. Nubs 142 are formed on end 240 to extend therefrom and are engageable with apertures 140 of base plate 34, see also FIG. 7. Flat cutaway portions 248 are formed in outer annular peripheral surface 250 of cam 38 adjacent end 242. Portions 248 are 180° opposed and are engageable with corresponding flat portions 100, 122 of expanders 48, 50, respectively.

Figure 9A:
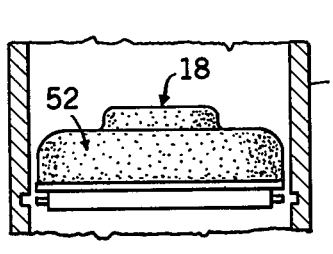
FIG. 9 (a–c) graphically illustrates the dual radially expanding sealing action of the resilient seal member of this invention.
Figure 9B:
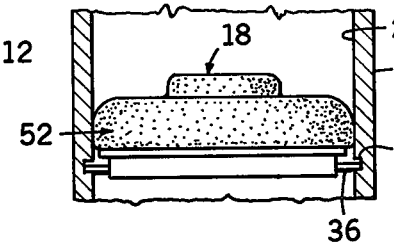
Figure 9C:
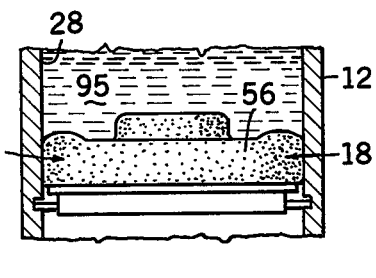

FIGS. 9a-c graphically illustrate the first and second sealing capabilities of plug 18. FIG. 9a illustrates plug 18 inserted into port 12. FIG. 9b illustrates plug 18 inserted in port 12 whereby resilient seal 52 is radially expanded into sealing engagement with inner surface 28 of port 12 and locking tabs 36 are extended into locking engagement with groove 32 thus providing a first sealing capability of plug 18. FIG. 9c illustrates plug 18 radially expanded and locked in sealing position within port 12 and further illustrates that force exerted on axially facing disc-like annular end wall 56 due to waste fluid 95 accumulating in port 12, collapses air space 99 (FIG. 10) and urges seal member 52 into further sealing engagement with inner surface 28 of port 12 thus providing the second sealing capability of plug 18.

Operation

Prior to operation, base plate 34 including attach fastner 40, cam plate 37 and cover 148 are preassembled. Attach fastner 40 is inserted through aperture 138 of base plate 34 so that surface 178 of flanged portion 174 abuts surface 131 of plate 34 adjacent aperture 138. Cam plate 37 is then mounted on attach fastner 40 so that keys 196 of aperture 194 engage corresponding keyways 172 of attach fastner 40. In this manner, cam 37 is mounted for rotation with attach fastner 40 relative to plate 34. Also, cam 37 is mounted so that keys 156 of locking tabs 36 engage keyways 198. Cover 148 is then mounted on base plate 34 so that apertures 218 of plate 148 are aligned with apertures 144 of base plate 34. Then the base plate and the cover are secured by rivets 146 or the like. Thus, the foregoing forms a generally cylindrical base plate including a locking mechanism via tabs 36. Cam 38 may then be mounted on plate 34 by inserting attach fastner 40 through bore 244 of cam 38 and fitting nubs 142 into corresponding apertures 140 of plate 34. In this manner, cam 38 is mounted for fixed rotation with plate 34. Radially expandable portion 42 is then mounted adjacent end 242 of cam 38 so that opposed flats 248 engage correspondingly opposed flats 100, 122 of portion 42 and flat portion 82 of disc 44 engages corresponding flat portion 184 of attach fastner 40. Attach nut 46 may then be affixed to correspondingly threaded portion 182 of attach fastner 40. Resilient seal member 52 is then mounted on radially expandable portion 42 and secured theron by lip portion 73 so that nut 46 fits into recess 58 of the seal member, endwall 68 of the seal member abuts surface 71 of disc 44 and inner periphery 70 of member 52 embraces outer portions 96, 118 of expanders 48, 50 respectively.

With assemmbly completed as hereinabove described, it can be appreciated that plug 18 can be inserted into port 12 as illustrated in FIG. 9a. Second end 228 of key 220 is insertable through aperture 210 of cover 148 and into bore 164 of fastner 40 so that slot 230 engages roll pin 186. Similarly, roll pin 232 is insertable through slots 212 of plate 148. Rotation of key 220, when engaging pin 186 permits rotation of fastner 40 and cam 37 is unison relative to plate 34. Thus keys 156 follows keyways 198 to pivot locking tabs 36 about their respective pins 150 to extend or retract the tabs through guides 136. Similarly, rotation of fastner 40 also rotates expandable portion 42 relative to cam 38 so that relative rotating motion between expanders 48, 50 in engagement with outer periphery 250 of cam 38 moves the corresponding flats 100, 122 relative to stationary flats 248 of cam 38. Thus, rotation of the flats 100, 122 from engagement with flats 248 of cam 38 to engagement with outer periphery 250 of the cam pivots expanders 48, 50, respectively, about their respective pins 84, 86 to radially displace the expanders outwardly relative to cam 38 from position A to position B, FIG. 5, thus radially expanding resilient member 52.

When plug 18 is secured in port 12, FIG. 12, 9a, outer periphery 72 of resilient member 52 is radially urged into sealing engagement with inner periphery 28 of the port thus providing the first sealing capability of plug 18. Locking tabs 36 are extended into groove 32 to secure the plug in the port and the longitudinal axis of roll pin 186 of attach fastner 40 is displaced 90° from the similar axis of slots 212 of plate 148. Flats 100 and 122 engage outer periphery 250 of cam 38 and keys 156 of locking tabs 36 are positioned at second end 202 of keyways 198 in cam plate 37. Valve 10 may be secured to port 12 in the conventional manner. Waste fluid 95 or pressurized fluid in the aircraft (FIG. 9c) may then accumulate in port 12 and force caused thereby will collapse air space 99 (FIG. 10) to urge seal 52 into further sealing engagement with inner surface 28 of port 12 thus providing the second sealing capability of plug 18.

For removal of the plug, second end 228 of key 220 may then be inserted into the plug via aperture 210 of cover plate 148 so that the opposed extended ends of pin 232 move freely through the plate so that when groove 230 engages roll pin 186 pin 232 is between cam plate 37 and cover plate 148. Plate 34 of the plug being limited from rotation relative to port 12 due to engagement of keys 132 with stops 134, key 220 may be rotated 90° counterclockwise from the above-described position by applying a rotating force to second end 224 of key 220 through handle 226. This action rotates attach fastner 40, cam plate 37 and radially expanding portion 42 relative to base plate 34. Thus, keys 156 of locking tabs 36 move along keyways 198 to pivot the locking tabs radially inwardly out of engagement with groove 32 and simultaneously expander 42 is rotated to permit flats 100, 122 thereon to engage flats 248 of cam 38 thus permitting radially inward movement of expander portions 48, 50 from position B to position A due to the resilience of resilient portion 52 thus releasing resilient portion 52 from sealing engagement with inner periphery 28 of port 12. At this point, extensions 232 of key 220 are rotated 90° with respect to their accommodating slots 212 so that extensions 232 may engage side 208 of plate 148 adjacent aperture 210 thus permitting force applied to handle 226 of key 220 in a downward direction away from port 12, as viewed in FIG. 3, to urge plug 12 out of the port. In this manner, plug 18 may be retracted from port 12 into conduit 22 of valve 10 while waste is drained from the port through conduit 24 of the valve. When the port is drained, plug 18 may be reinserted into port 12 by means of moving the plug upward into the port. With keys 132 properly guided between stops 134, handle 226 of key 220 may be rotated 90° clockwise. Thus, the engagement of groove 230 with roll pin 186 rotates fastner 40, cam plate 37 and expandable portion 42 so that keys 156 follow keyways 198 to extend locking tabs 36 into groove 32 while flats 100, 122 of expander portions 48, 50, respectively, are rotated out of engagement with flats 248 of cam 38 and into engagement with outer periphery 250 of the cam thus pivoting expander portions 48, 50 about pins 84, 86, respectively, from position A to position B to urge sidewall 54 of resilient portion 52 into sealing engagement with inner periphery 28 of port 12. Extensions 232 now being axially aligned with slots 212 of aperture 210, key 220 may be retracted out of engagement with plug 18 and valve 10 may be removed from port 12 with plug 18 remaining secured in the port.

The foregoing describes a novel plug for use in a known valve for sealing an aircraft lavatory drain port including a radially expandable portion for radially urging a resilient member into sealing engagement with the port.

Having thus described the invention in its best embodiment and mode of operation, that which is desired to be claimed by Letters Patent is:

1. In combination with a valve of the type attachable to an aircraft lavatory drain port, the valve being generally tubular and axially alignable with the port and having a lateral outlet integratedly formed therewith, the valve including means for engaging a port plug to move the plug into and out of engagement with the port, the improvement comprising the port plug including:
   a. a base plate;
   b. a first cam mounted on the base plate in fixed relationship therewith;
   c. radially expandable means connected for relative rotatable relationship with the first cam, the radially expandable means including:
      i. a disc portion; and
      ii. radial exanders pivotally mounted on the disc, each of the expanders including a radially inwardly facing peripheral surface being generally annular and having alternate curvilinear and rectilinear portions;
   d. radially outwardly facing peripheral surface means on the first cam being generally annular and having alternate curvilinear and rectilinear portions for cooperating engagement with the alternative curvilinear and rectilinear portions, respectively, of the expanders, and, upon relative rotating motion between the first cam and the expandable means, for pivoting the expanders radially outwardly with respect to the disc portion due to engagement of the curvilinear and rectilinear portions of the cam with the rectilinear and curvilinear portions, respectively, of the expanders;
   e. resilient seal means radially embracing the expanders and including an axially extended face for enclosing an airspace in axial relationship with the expanders; the resilient seal means including:
      i. radially facing annular means mounted on the expanders for radial expansion therewith; and ii. axially facing annular means integratedly formed with the radial facing means and maintained axially spaced from the expanders for enclosing an airspace therebetween and including a disc having at least one convolution concentric with and radially inwardly spaced from the radially facing annular means;
f. radially inwardly protruding lip means on the seal means formed with the radially facing annular means for securing the resilient seal means into engagement with the radially expandable means;
g. a second cam mounted on the base plate in relative rotatable relationship therewith; and
h. locking means mounted on the base plate for outward slidable radial extension thereof with respect to the base plate into locking engagement with the port upon rotation of the second cam.

* * * * *